United States Patent [19]

Murphy et al.

[11] Patent Number: 5,169,728

[45] Date of Patent: Dec. 8, 1992

[54] MULTILAYERED FILM

[75] Inventors: Mark Murphy, Richterswil, Switzerland; Bengt C. G. Jennergren, Norrköping, Sweden

[73] Assignee: The Dow Chemical Company, Midland, Mich.

[21] Appl. No.: 663,216

[22] Filed: Feb. 28, 1991

Related U.S. Application Data

[63] Continuation-in-part of Ser. No. 371,158, Jun. 26, 1989, abandoned.

[51] Int. Cl.$^5$ .............................................. B32B 27/08
[52] U.S. Cl. .................................... 428/516; 428/216; 428/220; 428/349; 428/213
[58] Field of Search ................ 428/515, 516, 517, 519

[56] References Cited

U.S. PATENT DOCUMENTS

| | | | |
|---|---|---|---|
| 4,277,578 | 7/1981 | Yoshimura et al. | 428/518 X |
| 4,418,114 | 11/1983 | Briggs et al. | 428/218 |
| 4,424,243 | 1/1984 | Nishimoto et al. | 428/36 |
| 4,619,859 | 10/1986 | Yoshimura et al. | 428/518 X |
| 4,863,769 | 9/1989 | Lustig et al. | 428/516 X |
| 5,041,316 | 8/1991 | Parnell et al. | 428/518 X |

FOREIGN PATENT DOCUMENTS

| | | |
|---|---|---|
| 229715 | 1/1987 | European Pat. Off. |
| 61-200142 | 4/1986 | Japan. |

*Primary Examiner*—George F. Lesmes
*Assistant Examiner*—D. R. Zirker

[57] ABSTRACT

The multilayered film has a base layer (A) and at least one surface layer (B).

The film-forming component of base layer (A) is at least one copolymer of A1) ethylene and A2) acrylic or methacrylic acid or an ionomer thereof in the absence of substantial amounts of other polymers. The film-forming component of base layer (B) is at least one copolymer of ethylene and up to about 25 weight percent of at least one alpha-olefin having from 3 to 12 carbon atoms, the copolymer having a density of about 0.880 to about 0.935 g/cm$^3$, in the absence of substantial amounts of other polymers. The weight of the base layer (A) is from 25 to 75 percent by the total weight of (A) and (B). The overall thickness of the multilayered film is from about 5 to about 40 micrometers.

The multilayered film is useful for wrapping food.

12 Claims, No Drawings

MULTILAYERED FILM

CROSS REFERENCE TO RELATED APPLICATION

This application is a Continuation-in-Part of the copending application Ser. No. 07/371,158, filed Jun. 26, 1989, now abandoned.

BACKGROUND OF THE INVENTION

The present invention relates to a multilayered, substantially non-oriented film comprising a base layer and at least one surface layer, to a process of producing the multilayered film and to the use of the multilayered film for wrapping food.

Films which are used for wrapping food such as vegetables, meat or fish have to meet a number of requirements, among others a good puncture resistance and a good elastic recovery. Polyvinylchloride (PVC) films meet these requirements and have been used in the past to a great extent for wrapping food. However, due to the increasing environmental concerns about the extended use of PVC films, the skilled artisans have tried to replace PVC films with other films having similar properties but causing less environmental concerns. Much research effort has been spent on ethylene homo- or copolymers or mixtures of these polymers with other polymers.

The abstract of Japanese Patent Application 61200142 discloses a composition which is composed of 80 to 99.9 weight percent of polyolefin resin containing an ethylene/acrylic copolymer as essential component and 20 to 0.1 weight percent of a water-absorbable resin of polyacrylic acids. The polyolefin is for example polyethylene, an ethylene/vinyl acetate copolymer, an ethylene/acrylic acid copolymer or polypropylene. The ethylene/acrylic copolymer is for example an ethylene/acrylic acid copolymer or an ionic copolymer thereof Evidently a monolayered film is made from this resin composition of which the essential property is said to be its excellent water-adsorbability.

The abstract of Japanese Patent Application 61083038 discloses a multilayered bag which has an inner layer of a polyolefinic resin and an anti-fogging agent. It is disclosed that each layer can be produced of a polyolefin resin such as polyethylene, polypropylene, an ethylene/vinyl acetate polymer, an ethylene/acrylic acid copolymer etc. Unfortunately, the disclosed teaching is so broad and unspecific with respect to the polymers in the multilayered film that the skilled artisan does not learn what type of polymer are to be selected in order to produce a film having the desired properties.

U.S. Pat. No. 4,277,578 relates to heat shrinkable packaging films from polyolefin blends. The blends consist of an ethylene/alpha-olefin copolymer with a density of up to 0.91 g/cm$^3$ with a polymer (a) and/or (c). Polymer (a) is a low density polyethylene and/or a copolymer of ethylene with a vinylester, with an unsaturated aliphatic monocarboxylic acid such as acrylic acid or with its alkyl ester and polymer (c) is a crystalline polypropylene, a high density polyethylene and/or crystalline polybutene-1. U.S. Pat. No. 4,277,578 teaches that a film of poor dimensional stability is obtained when the amount of polymers (c) is below a certain level and that such a film tends to undergo deterioration by aging.

U.S. Pat. No. 4,619,859 discloses a multilayered oriented film of good sealability and stretchability having at least three layers, preferably five layers. It contains a base layer which consists of a mixture of an ethylene type polymer and a soft elastomer, a core layer produced of polypropylene and polybutene-1 and a surface layer containing an ethylene type polymer, a soft elastomer, crystalline 1,2-polybutadiene and/or a soft ionomer resin from an ethylenic copolymer. The ethylene type polymer is selected from a low density polyethylene, a copolymer of ethylene with a vinyl ester monomer, an aliphatic unsaturated monocarboxylic acid or with an alkyl ester of that monocarboxylic acid. Instead or in addition to the ethylene type polymer the base layer may contain a crystalline polypropylene or a crystalline polybutene-1 for improving the strength and the workability of the film. Unfortunately, the production of the multilayered oriented film which contains at least three different layers and wherein at least one of the layers contains a mixture of various types of polymers is labor intensive and the film structure is complicated. For example, the preparation of the mixtures by kneading and extrusion requires expensive machines.

European Patent Application 0 243 965 discloses a multilayered film useful for packaging vegetables and fruits. The film has a base layer A and at least one surface layer B containing an anti-fogging agent. The base layer A is a mixture of 1) one or more copolymers of alpha-olefins having 2 to 10 carbon atoms and 2) one or more copolymers containing monomer units selected from vinyl acetate, acrylic acid and styrene and other copolymerizable monomer units such as ethylene, propylene, acrylates, butadiene and the like. Random or block copolymers of 2 or more alpha-olefins having 2 to 10 carbon atoms are preferred for producing the surface layer(s) B. This film is designed for producing bags. Furthermore, the disclosed teaching is so broad and unspecific with respect to the polymers in the multilayered film that the skilled artisan does not learn what type of polymers are to be selected in order to produce a film which is useful for wrapping food instead of producing bags.

U.S. Pat. No. 4,418,114 discloses a stretch-wrap film comprising a layer of linear low density polyethylene (LLDPE) laminated to a branched ethylene containing polymeric layer. Specifically, the stretch-wrap film contains relatively thin outer layers of highly branched low density polyethylene and a relatively thicker LLDPE core layer.

U.S. Pat. No. 4,424,243 discloses a heat-shrinkable multilayered laminate film possessing excellent heat resistance, oil resistance and gas-barrier properties. The film is made of a core layer of a vinylidene chloride copolymer, an intermediate layer of a thermoplastic resin, such as an ethylene/vinyl acetate copolymer or 1,2-butadiene, and a surface layer of an ethylene/alpha olefin copolymer, such as LLDPE. The U.S. patent indicates that the laminate film is preferably made in tubular form. It is suitable for use in packaging by heat shrinkage meat, cheese and other fat-containing food.

European Patent Application 0 229 715 relates to multilayered heat-shrinkable films. The films are high shrinkage/low shrinkage force shrink films. The films have one or two outer layers of material selected from the group consisting of polyethylene, polypropylene, propylene/ethylene copolymers and blends thereof. The films have a core layer of material having a melting point below the temperature required to orient the material of the outer layer or layers and is selected from the group consisting of ethylene/acid copolymers and related ionomers; ethylene/acid/acrylate terpolymers and related ionomers; blends of the above with up to about 50% ethylene/vinyl acetate copolymers; blends of ethylene/ester copolymers with up to about 50% ethylene/vinyl acetate copolymers; and combinations of the above materials. The core layer constitutes about 50 to 95%, preferably about 60 to 90%, of the thickness of the overall film. Preferably, however, the combined thickness of the outer layers does not exceed about 15% of the thickness of the final film because otherwise greater stress is required to orient the film, leading to a film with a higher shrink force. The films of the European Patent Application 0 229 715 are prepared by lamination or extrusion and a subsequent orientation step. According to the disclosed methods a film is produced, quenched and then reheated to produce the final stretched or oriented film. Unfortunately, the Elmendorf tear strength of the produced oriented film according to the examples is very low (20 g/mil at the most and in nearly all cases considerably less).

Accordingly, it would be desirable to provide new multilayered films which are useful for packaging food products, in particular fresh food such as meat, fish, cheese, vegetables and fruit. In particular, it would be desirable to provide such films which do not require expensive blending techniques or equipment when manufacturing them. Furthermore, it would be desirable to provide films with good puncture resistance and deformation recovery properties. A high puncture resistance is for example important when packaging meat with bones. Good deformation recovery properties are very important for films which will be used as a packaging material for food. Typically the food is sold in self-service shops where many customers touch the packages. By touching the film it is deformed at several spots. When the food is wrapped in films having insufficient deformation recovery properties the packaged food looks unfresh after a short time and often cannot be sold anymore.

It would also be desirable to provide films which can be wrapped around the food in automatic packaging machines in particular in high speed packaging machines. In particular, it would be desirable to provide films which can be easily cut into individual samples in their cross direction but which have a high tear strength in their machine direction in order to avoid splitting of the film during the packaging process.

SUMMARY OF THE INVENTION

One aspect of the invention is a multilayered, essentially non-oriented film comprising a base layer (A) of which the film-forming component is at least one copolymer of A1) ethylene and A2) acrylic or methacrylic acid or an ionomer of acrylic or methacrylic acid, in the absence of substantial amounts of other polymers, and at least one surface layer (B) of which the film-forming component is at least one copolymer of ethylene and up to about 25 weight percent of at least one alpha-olefin having from 3 to about 12 carbon atoms, the copolymer having a density of about 0.880 to about 0.935 g/cm$^3$, in the absence of substantial amounts of other polymers, the weight of the base layer (A) being from about 25 to about 75 percent by the total weight of (A) and (B) and the overall thickness of the multilayered film being from about 5 to about 40 micrometers.

A further aspect of the present invention is a process for producing the multilayered film by coextruding the base layer (A) and at least one surface layer (B).

Yet another aspect of the present invention is a method of packaging food with the multilayered film of the present invention wherein the film is wrapped around the food and then sealed, preferably by heat.

DETAILED DESCRIPTION OF THE INVENTION

The multilayered film of the present invention is essentially non-oriented. By an "essentially non-oriented film" is meant a film which is not oriented in a separate, subsequent step after its production; specifically, a film which is not reheated and mechanically stretched in one or two directions after it has been produced.

The multilayered film has a base layer (A) and at least one surface layer (B). The weight of the base layer (A) is from 25 to 75 percent, preferably from 30 to 70 percent and more preferably from 40 to 60 percent of the total weight of (A) and (B). If the multilayered film has more than one surface layer (B), the total weight of the surface layers has to be chosen in such a manner that the above mentioned weight ratios are met. Most preferably, the multilayered film has two surface layers (B) which cover both surfaces of base layer (A).

The film-forming component of base layer (A) is at least one copolymer of A1) ethylene and A2) acrylic or methacrylic acid or an ionomer thereof. By "film-forming component" is meant that the base layer may contain known additives such as slip or anti-block agents or tackifiers; however, that the copolymer of ethylene and an ethylenically unsaturated carboxylic acid is not mixed with substantial amounts of other polymers such as polyethylene. By "substantial amounts" are meant amounts which can influence the properties of the film. The mentioned known additives may be useful for facilitating the production of the multilayered film. When the multilayered film of the present invention only contains one surface layer (B), it may be useful to include a known anti-fogging agent into the base layer (A). In general, the copolymer of A1) and A2) is not mixed with any amounts of other types of polymers. The copolymer in base layer (A) preferably contains in copolymerized form from about 75 to about 98 percent, more preferably from about 85 to about 97 percent and most preferably from about 90 to about 95 percent of a A1) ethylene and preferably from about 2 to about 25 percent, more preferably from about 3 to about 15 percent and most preferably from about 5 to about 10 percent of A2) acrylic acid and methacrylic acid or an ionomer thereof, based on the total weight of A1) and A2). Acrylic acid is the most preferred comonomer in base layer (A). A portion or all of the acrylic or methacrylic acid may have been converted into an ionomer thereof by treatment with a basic material. Preferred ionomers are alkali metal ionomers such as sodium ionomer, alkaline earth metal ionomers such as magnesium and the zinc ionomers. The density of the copolymer(s) in base layer (A) generally is from 0.91 g/cm$^3$ to 0.95 g/cm$^3$, preferably from 0.92 g/cm$^3$ to 0.94 g/cm$^3$, measured according to ASTM Method D-792. The melt index preferably is from 0.1 g/10 min. to 30 g/10 min., more preferably from 1 g/10 min. to 20 g/10 min., measured according to ASTM Method D-1238, Condition (E). The base layer (A) may contain more than one type of copolymers of A1) ethylene and A2) acrylic acid or methacrylic acid or an ionomer thereof. However, when using a blend of such copolymers it is recommended that all copolymers contain the same copolymerized monomer A2). Blending such polymers is not difficult and does not require expensive blending equipment. Most preferably, base layer (A) contains only one type of film-forming polymer. A blending step can be avoided and the films having a base layer (A) which contains only one type of film-forming polymers have surprisingly good deformation recovery properties.

The copolymer(s) in base layer (A) can be prepared by methods well known in the art. Typically it is produced by a gas phase polymerization process in a high pressure autoclave. The base layer (A) may contain a mixture of different copolymers of A1) and A2).

Useful ethylene copolymers contain ethylene in an amount of about 75 percent or more, preferably 80 percent or more, most preferably from 80 to 95 percent by weight and up to 25 percent, preferably up to 20 percent, most preferably 5 to 20 percent by weight, of at least one alpha-olefin having from 3 to about 12, preferably from 4 to 8, carbon atoms per alpha-olefin molecule. Mixtures of different copolymers of ethylene and at least one alpha-olefin are also useful. Using mixtures requires an additional blending step which is preferably avoided although it does not create major problems. These polymers in surface layer(s) (B) preferably have melt indexes, as determined by ASTM Method D-1238 (190° C./2.16 kg) in the range of from 0.1 g/10 min. to 50 g/10 min. and have densities, as determined by ASTM Method D-792, in the range of from 0.880 g/cm³ to 0.935 g/cm3 Methods for the preparation of such polymers are well known in the art, for example as taught by Schildknecht, Polymer Processes, Vol. X (1956) or in Chemical Engineering News, December 5, 1977.

Useful polymers in the surface layer(s) (B) are linear low density polyethylenes.

By "linear low density polyethylene" (LLDPE) is meant normally solid ethylene polymers suitable for extrusion, casting, molding or similar fabrication produced by polymerization of ethylene with up to 25 percent by weight of the polymer of at least one alpha-olefin having from 3 to 12, preferably 4 to 8, carbon atoms per olefin molecule.

The LLDPE copolymers preferably used in the surface layer(s) (B) are those which are for example prepared using coordination catalysts, e.g., the well known Ziegler, Natta or Phillips catalysts. This includes those made at low, intermediate or high pressures. These ethylene polymers contain up to about 25 percent, preferably from about 5 to about 15 percent, more preferably from 5 to 10 percent, by weight of at least one alpha-olefin comonomer which is preferably selected from the group consisting of propylene, 1-butene, 1-isobutene, 4-methyl-1-pentene, 1-pentene, 1-isopentene, 1-hexene, 1-isohexene, 1-heptene, 1-isoheptene, 1-octene, 1-isooctene, 1-nonene, 1-isononene, 1-decene and 1-isodecene, 1-hexene, 4-methyl-1-pentene, 1-butene, propylene and in particular 1-octene are the most preferred comonomers. The amount of comonomers used should generally be enough to result in polymer densities in the low range of 0.880 to 0.935 g/cm³, preferably from 0.890 to 0.920 g/cm³. The copolymers generally have a high molecular weight and have a melt index (melt flow) in the range of 0.1 to 30 dg/min., preferably of from 0.1 to 20 dg/min. as measured by ASTM Method D-1238, Condition (E). These LLDPE polymers are recognized in the art as having excellent strength, resistance to tear propagation and exhibit good resistance to tearing or puncturing. This performance of the LLDPE polymers is especially important in food packaging applications and most especially in packaging of meat.

By "linear low density polyethylene" is also meant terpolymers of ethylene, an alpha-olefin having 3 or 4 carbon atoms and an alpha-olefin having 5 to 12 carbon atoms per molecule which terpolymers are disclosed in European Patent Application A-010428 the teaching of which is incorporated herewith by reference. The alpha-olefin having 3 or 4 carbon atoms to be terpolymerized with ethylene is propylene or butene-1. Examples of the alpha-olefin having 5 to 12 carbon atoms include 1-pentene, 1-hexene, 4-methyl-1-pentene, 3-methyl-1-pentene, 1-heptene, 1-octene, 1-decene and 1-dodecene of which 1-octene is preferred. The terpolymer is preferably produced of 90 to 99.5 mol percent, more preferably 92 to 99 mol percent, of ethylene, 0.2 to 9.8 mol percent, more preferably 0.3 to 7 mol percent, of the alpha-olefin having 3 or 4 carbon atoms, and 0.2 to 9.8 mol percent, more preferably 0.3 to 7 mol percent, of the alpha-olefin having 5 to 12 carbon atoms. The linear ethylene polymers having polymer densities in the range of 0.880 g/cm³ to 0.920 g/cm³ are usually referred to as linear very low density polyethylene (VLLDPE). The density of the polymer can be chosen according to the preferred properties of the multilayered film. Generally at higher densities the mechanical strength increases and at lower densities the elastic recovery increases. The surface layer(s) (B) can have more than one type of the described polymers, however, preferably each surface layer only contains one type of the described polymers. If the multilayered film contains more than one surface layer (B), the polymer need not be the same in all the surface layers (B). For example, the multilayered film may consist of three layers, of which the first surface layer (B) contains a linear very low density polyethylene having a density between 0.880 g/cm³ and 0.920 g/cm³ which results in good mechanical properties such as elastic recovery and tear resistance, the base layer (A) contains the above described polymers and the second surface layer (B) contains a linear low density polyetheylene having a density between 0.920 g/cm³ and 0.935 g/cm³ which provides the film with the desired stiffness. The surface layer(s) (B) may also contain a mixture of one or more linear low density polyethylenes and of one or more linear very low density polyethylenes.

The expression "film-forming component" referring to surface layer (B) is defined in the same way as said expression referring to the base layer (A). In addition to the film-forming component the surface layer(s) (B) may contain optional additives such as stabilizers, antioxidants or lubricants. In some cases it may be useful to incorporate an anti-fogging agent in one or all surface layers (B). Addition of an anti-fogging agent is particularly recommended when the multilayered film will be used for packaging material of a high water content such as fruits or meat in order to prevent a condensate of small water droplets on the surface of the film which faces the packaged food. Useful anti-fogging agents are known. Preferred types of anti-fogging agents are compounds of Formula I

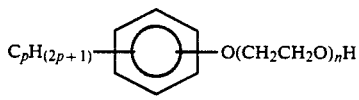

$$C_pH_{(2p+1)}—\bigcirc—O(CH_2CH_2O)_nH \quad (I)$$

wherein n is an average number of 3 to 8 and p is 9 or 10. The surface layer (B) generally contains from 0.8 to 5 percent by weight of the anti-fogging agent. When a compound of Formula I is used, an amount of from 0.1 to 1.0 percent, preferably to from 0.4 to 0.8 percent by weight of the surface layer (B) is usually sufficient.

It may also be useful to include a cling additive such as a fatty acid ester or a polyisobutylene or another known cling additive in the surface layer (B), generally in an amount of 0.1 to 5 percent by weight of the surface layer (B).

The overall thickness of the multilayered film is from about 5 to about 40 micrometers, preferably from 10 to 20 micrometers, more preferably from 13 to 17 micrometers. Preferably the ratio of the thickness of the base layer (A) to the total thickness of the surface layer(s) (B) is from 0.5:1 to 2:1, more preferably from 0.75:1 to 1.3:1. Although there is no limitation of thickness of each layer, it is preferred that the thickness of the base layer (A) is from 5 to 10 micrometers, more preferably from 6 to 9 micrometers and the thickness of each surface layer (B) is from 2 to 6 micrometers, more preferably from 3.0 to 4.5 micrometers.

The multilayered films of the present invention can be prepared in a known way by coextruding the base layer (A) and at least one surface layer (B). The production of blown and cast films is generally known. Preferably, cast films are produced by coextruding layers (A) and (B) through a flat dye. Most preferably, the produced multilayered film has a sequence of layers B/A/B. Further preferred multilayered films have the sequence B/A/B/A, B/A/B/A/B, B/A/B/A/B/A or B/A/B/A/B/A/B and so on. Typically the multilayered film is coextruded at a temperature of from about 180° C. to about 280° C., preferably of from about 240° C. to about 260° C. After the production of the film by coextrusion, the film is used in its essentially non-oriented form. This means that the produced film is not subjected to an orientation step (in known orientation steps the produced films are reheated and mechanically stretched in one or two directions whereby an orientation of the film takes place).

The multilayered films of the present invention have a high puncture resistance and good deformation recovery properties.

A further aspect of the present invention is a method of packaging food with the multilayered film of the present invention. According to one method the food may be wrapped by hand with the multilayered film of the present invention. Preferably, the method of wrapping food with the multilayered film is carried out automatically. According to this method the food is placed in a container or on a tray, the film of the present invention is automatically wrapped around the container or the tray and is sealed, for example, by applying heat. According to a preferred embodiment of this method the packaging machine is equipped with a roll of the multilayered film of the present invention. The roll of the film is fed in the machine direction of the film into the packaging machine. A portion of the film is unrolled and cut in the cross direction of the film while being held by a spreading device. The container or tray having the food is then brought into contact with the film; preferably it is pushed upwards from beneath towards the film. The film is then wrapped around the container or the tray, preferably in such a way that the ends of the film piece contact each other below the container or tray. The ends of the film piece are then sealed together, for example, by heat sealing. Heat sealing can be carried out by contacting the bottom of the container or of the tray with a heated plate.

For sealing the films of the present invention the films preferably are heated to a temperature between 80° C. and 180° C., more preferably between 140° C. and 160° C.

The multilayered film of the present invention is useful for automatic packaging. Trials to automatically package food with a film produced of an ethylene homopolymer or a copolymer of ethylene and an alpha-olefin only have not shown satisfactory results. The use of the film of the present invention in a process for automatically wrapping food is very advantageous since the wrapping machine can be run at a high speed. Generally the machine can be run at such a speed that from 25 to 180, preferably from 80 to 120 containers or trays can be wrapped with the film per minute.

It has been surprisingly found that the multilayered, essentially non-oriented films of the present invention have a very high Elmendorf tear strength in machine direction. This property of the film is very important for films to be used on automatic food wrapping machines. In the practice of automatically wrapping food, a film roll is fed in the machine direction of the film into the wrapping machine. The "endless" film is held on both long ("endless") sides of the film and is cut into individual film samples in cross direction of the film. If the Elmendorf tear strength in the machine direction is low, the film will split along its entire length and the film is wasted. The surprisingly high Elmendorf tear strength of the non-oriented film of the present invention renders it very suitable for wrapping goods on wrapping machines.

Furthermore, the film of the present invention has a Elmendorf tear strength in cross direction which is generally lower than the Elmendorf tear strength in machine direction. A lower tear strength in cross direction is highly desired for automatic and hand food wrapping since this property allows easy cutting of the film in cross direction into individual samples. Due to the easy cutting ability of the film a wrapping machine can run at a high speed with minimum wear on the cutting knives.

The invention is further illustrated by the following examples which should not be construed to limit the scope of the invention. All parts and percentages are by weight unless otherwise mentioned.

The following polymers and additives are used for producing the multilayered films:

an ethylene/acrylic acid copolymer (EAA-1) containing 9 weight percent copolymerized acrylic acid and having a melt index of 1.5 g/10 min. and a density of 0.938 g/cm³;

an ethylene/acrylic acid copolymer (EAA-2) containing 9 weight percent copolymerized acrylic acid and having a melt index of 3.0 g/10 min. and a density of 0.938 g/cm³;

an ethylene/acrylic acid copolymer (EAA-3) containing 9 weight percent copolymerized acrylic acid and having a melt index of 5.0 g/10 min. and a density of 0.938 g/cm³;

a linear low density polyethylene (LLDPE-1) having a nominal content of copolymerized 1-octene of 7-8 weight percent, a melt index of 3.3 g/10 min. and a density of 0.917 g/cm³;

a linear low density polyethylene (LLDPE-2) having a nominal content of copolymerized 1-octene of 7-8 weight percent, a melt index of 2.3 g/10 min. and a density of 0.917 g/cm³;

a linear low density polyethylene (LLDPE-3) having a nominal content of copolymerized 1-octene of 6-7 weight percent, a melt index of 6.0 g/10 min. and a density of 0.919 g/cm³;

a linear very low density polyethylene (VLLDPE-1) having a nominal content of copolymerized 1-octene of 10-11 weight percent, a melt index of 2.0 g/10 min. and a density of 0.912 g/cm³;

a linear very low density polyethylene (VLLDPE-2) having a nominal content of copolymerized 1-octene of 11-12 weight percent, a melt index of 7.0 g/10 min. and a density of 0.910 g/cm³, The octene content in LLDPE-1, LLDPE-2, LLDPE-3, VLLDPE-1 and VLLDPE-2 is determined according to ASTM Method D-2238, Method B.

In all examples and in Comparative Examples A and B a three layer film is produced by flat dye extrusion at a melt temperature between 240° C. to 280° C. and at a line speed of 150 m/min. The thickness of the film in all examples and in Comparative Examples A and B is between 14 and 16 micrometers. The thickness of the base layer (A) is about 7 to 8 micrometers and the thickness of each surface layers (B) is about 4 micrometers. In each example and in Comparative Examples A and B a film structure A/B/A/ is produced wherein the weight percentage of the layers is 25/50/25.

In Comparative Example C a commercially available monolayered polyvinylchloride film having a thickness of 14 micrometers is used.

The physical properties of the produced films listed in the following tables are measured as follows:

Dart drop impact (g) ASTM Method D-1709
Elmendorf tear strength (g): ASTM Method D-1922
  "MD" means: machine direction
  "CD" means: cross direction.

The recovery (%) and the puncture energy (J) are measured as described below:

a) Recovery

A tensile test machine JJ Type T 500 is used which is equipped with a probe of 12.5 mm diameter having a hemispherical tip of polytetrafluoroethylene. A film sample is changed with a clamping ring having an inner diameter of 125 mm. The probe is lowered until it just touches the film samples (starting position). The probe is then further lowered to a depth of 25 mm at a rate of 100 mm/min. whereby the film sample is deformed. A force/deflection curve is recorded. The deflection is recorded on the x-axis.

The probe is then withdrawn from the film sample at a rate of 100 mm/min. until it reaches its starting position. One minute after the withdrawal of the probe has commenced, the probe is relowered at the same rate to the same depth and a second force/deflection curve is recorded. The separation of the first and the second curve on the x-axis is due to the additional movement of the probe to contact the surface of the film that has not entirely recovered after the first deflection of 25 mm. The distance x between the two curves is always measured at a force of 1 Newton. From the distance x between the two curves the actual difference between the movement of the probe in the second run and in the first run is determined and the recovery in percent is calculated, based on this difference and on the total deflection (25 mm).

b) Puncture resistance (puncture energy)

The same clamping system is used but an aluminium probe having a diameter of 12.5 mm and a hemispherical tip having a radius of 6.25 mm is used. The probe is lowered at a rate of 500 mm/min. whereby the film sample is deformed.

The puncture energy in Joules to break the film is recorded.

TABLE 1

Examples 1 to 3 and Comparative Example A

| Film structure | Example 1 LLDPE-1/EAA-2/LLDPE-1 | | Example 2 LLDPE-1/EAA-1/LDPE-1 | | Example 3 LLDPE-1/EAA-3/LLDPE-1 | | Comp. Example A LLDPE-1/VLLDPE-1/LLDPE-1 | |
|---|---|---|---|---|---|---|---|---|
| Dart drop impact (g) | — | | 108 | | 93 | | 143 | |
| Elmendorf tear resistance (g) | MD 224 | CD 40 | MD 243 | CD 26 | MD 201 | CD 82 | MD 185 | CD 293 |
| Puncture energy (J) | 0.74 | | 0.65 | | 0.60 | | 0.89 | |
| Recovery (%) | 91 | | 91 | | 94 | | 84 | |

Table I illustrates that a multilayered film wherein a copolymer of ethylene and at least one alpha-olefin having from 3 to 12 carbon atoms is used as a film-forming component of the base layer (A) has a considerably lower recovery than the films of the present invention which have the same surface layers (B) but which contain a copolymer of A1) ethylene and A2) an ethylenically unsaturated carboxylic acid as a film-forming component of the base layer (A).

The films of Examples 1 to 3 were subjected to packaging trials with commercially available packaging machines. The used packaging machines and the results of the trials are listed in Table II:

TABLE II

| Example | Used machine/results |
|---|---|
| 1 | An Automac 44 machine; 40 packages were wrapped. The film could easily be cut in CD, sealed well and showed an excellent recovery. |
| 2 | A Chick machine; trays having 3 or 4 apples were packed. The film could easily be cut in CD, sealed well and showed an excellent recovery. |
| 3 | An Automac 44 machine; 300 trays having 4 or 5 apples were packed. The film could easily be cut in CD, |

TABLE II-continued

| Example | Used machine/results |
|---|---|
| Comparative Example A | sealed well and showed an excellent recovery and strength. An Automac 44 machine; trays having 4 or 5 apples were packed. The film could easily be cut in CD, sealed well and showed a good film strength. However, the recovery of the film was insufficient. The films exhibited preferential MD splitting. |

The results of the packaging trials listed in Table II confirm the measurements of the physical properties listed in Table I.

EXAMPLE 6

| Film structure | LLDPE-3/EAA-2/LLDPE-3 | |
|---|---|---|
| Dart drop impact (g) | 170 | |
| Elmdendorf tear | MD | CD |
| Resistance (g) | 181 | 51 |
| Puncture energy (J) | 0.80 | |
| Recovery (%) | 88.0 | |

Two different film samples having the structure of the film of Example 6 were tested on an Automac 44 machine as described in Example 1. The film samples

TABLE III

Examples 4 and 5 and Comparative Examples B and C

| Film structure | Example 4 LLDPE-3/EAA-1/LLDPE-3 | | Example 5 LLDPE-3/EAA-3/LLDPE-3 | | Comp. Example B LLDPE-3/VLLDPE-2/LLDPE-3 | | Comp. Example C PVC | |
|---|---|---|---|---|---|---|---|---|
| Dart drop impact (g) | 86 | | 105 | | 85 | | 252 | |
| Elmendorf tear resistance (g) | MD 138 | CD 45 | MD 163 | CD 151 | MD 261 | CD 469 | MD 26 | CD 46 |
| Puncture energy (J) | 0.47 | | 0.71 | | 0.81 | | 0.33 | |
| Recovery (%) | 93 | | 93 | | 91 | | 95 | |

The puncture resistance (puncture energy) of the films of all examples is considerably higher than the puncture resistance of the PVC film of Comparative Example C.

Besides the physical properties of the films trials on a high speed their behavior in wrapping machine Automac 44 was evaluated. Trays with 4 or 5 apples were wrapped with the film. The films of Examples 4 and 5 and Comparative Example B could easily be cut in CD and sealed well.

The film of Example 4 exhibited excellent recovery and strength.

The film of Example 5 exhibited excellent recovery but split in the machine direction in numerous cases.

The film of Comparative Example B exhibited insufficient recovery and some tendency for machine direction splitting.

The comparison between Examples 4 and 5 shows that the evaluation of the Elmendorf tear resistance is not necessarily sufficient for predicting which film is the most useful one for automatic food wrapping on a given machine under given conditions such as machine speed and force of the spreading device. Although the film of Example 5 has a higher Elmendorf tear resistance than the film of Example 4, the film of Example 4 showed a higher strength in the food wrapping trial than the film of Example 5. This difference is believed to be due to the different testing conditions, i.e., a testing of a substantially motionless film versus a testing of a film running at a high speed on a packaging machine.

could easily be cut in cross direction, sealed well and showed a good recovery and strength.

EXAMPLES 7 TO 9

The same film structures as those in Example 1, 2 and 6 are prepared, their physical properties are measured and their usefulness for automatic food wrapping is determined as in Examples 1, 2 and 6. However, the time period between the production and the measurements of the films having the same structure (Examples 1/7, Examples 2/8 and Examples 6/9) is several months. Because of slightly different production and test conditions, such as different temperatures, different resin batches and so on, the results of the physical properties are not the same when measuring above mentioned individual films having the same structure. However, Examples 7 to 9 also confirm the superior recovery properties of the films of the present invention compared with the film of Comparative Example A (see Table IV) and the usefulness of the films of the present invention for automatic food wrapping (see Table V).

TABLE IV

Examples 7 to 9

| Film structure | Example 7 LLDPE-1/EAA-2/LLDPE-1 | | Example 8 LLDPE-1/EAA-1/LLDPE-1 | | Example 9 LLDPE-3/EAA-2/LLDPE-3 | |
|---|---|---|---|---|---|---|
| Dart drop impact (g) | 157 | | 174 | | 185 | |
| Elmendorf tear resistance (g) | MD 149 | CD 26 | MD 240 | CD 28 | MD 70 | CD 35 |
| Puncture energy (J) | 0.75 | | 0.66 | | 0.75 | |
| Recovery (%) | 95.1 | | 94.0 | | 88.5 | |

TABLE V

| Example | Used machine/results |
|---|---|
| 7 | Chick machine; trays having 3 or 4 apples were packed. The film could easily be cut in CD, sealed well and showed an excellent recovery. |
| 8 | An Automac 44 machine; trays having |

TABLE V-continued

| Example | Used machine/results |
| --- | --- |
|  | 4 or 5 apples were packed. The film could easily be cut in CD, sealed well and showed an excellent recovery and strength. |
| 9 | Chick machine; trays having 3 or 4 apples were packed. The film could easily be cut in CD, sealed well and showed a good recovery and strength. |

What is claimed is:

1. A multilayered, essentially non-oriented film consisting of
    at least one base layer (A) of which the film-forming component is at least one copolymer of A1) ethylene and A2) acrylic or methacrylic acid or an ionomer of acrylic or methacrylic acid, in the absence of substantial amounts of other polymers, and
    at least one surface layer (B) of which the film-forming component is at least one copolymer of ethylene and up to about 25 weight percent of at least one alpha-olefin having from 3 to about 12 carbon atoms, the copolymer having a density of about 0.880 to about 0.935 g/cm$^3$, in the absence of substantial amounts of other polymers,
    the weight of said at least one base layer (A) being from about 25 to about 75 percent by the total weight of (A) and (B) and the overall thickness of the multilayered film being from about 5 to about 40 micrometers.

2. The multilayered film of claim 1 wherein the weight of said at least one base layer (A) is from about 30 to about 70 percent of the total weight of (A) and (B).

3. The multilayered film of claim 1 wherein the copolymer (A) contains from about 2 to about 25 weight percent of copolymerized monomer A2).

4. The multilayered film of claim 3 wherein copolymer (A) contains from about 5 to about 10 weight percent of copolymerized monomer A2).

5. The multilayered film of claim 1 wherein the ratio of the thickness of said at least one base layer (A) to the total thickness of said at least one surface layer (B) is from 0.5:1 to 2:1.

6. The multilayered film of claim 5 wherein the ratio of the thickness of said at least one base layer (A) to the total thickness of said at least one surface layer (B) is from 0.75:1 to 1.3:1.

7. The multilayered film of claim 1 wherein the overall thickness is from 10 to 20 micrometers.

8. The multilayered film of claim 1 being a coextruded cast or blown film.

9. The multilayered film of claim 1 having two surface layers (B).

10. The multilayered film of claim 1 wherein the film-forming component of the surface layer(s) (B) is a copolymer of ethylene and 1-octene wherein the amount of copolymerized 1-octene is about 5 to about 15 percent of polymer weight and the film-forming component of the base layer(s) (A) is a copolymer of ethylene and acrylic acid wherein the amount of copolymerized acrylic acid is about 5 to about 10 percent by polymer weight and the weight of the base layer(s) (A) is from about 40 to about 60 percent by the total weight of (A) and (B).

11. The multilayered film of claim 9 wherein the film-forming component of the surface layers (B) is a copolymer of ethylene and 1-octene wherein the amount of copolymerized 1-octene is about 5 to about 15 percent by polymer weight and the film-forming component of the base layer(s) (A) is a copolymer of ethylene and acrylic acid wherein the amount of copolymerized acrylic acid is about 5 to about 10 percent by polymer weight and the weight of the base layer(s) (A) is from about 40 to about 60 percent by the total weight of (A) and (B).

12. The multilayered film of claim 1 wherein the surface layer(s) (B) contain an anti-fogging agent at an amount of 0.1 to 5 percent by weight of the surface layer(s) (B) or a cling additive at an amount of 0.1 to 5 percent by weight of the surface layer(s) (B) or both.

* * * * *